March 13, 1951  M. MEUNIER  2,545,101
ROTATING DIAPHRAGM TRANSDUCER FOR
SOLID MATERIAL TESTING
Filed Dec. 6, 1948
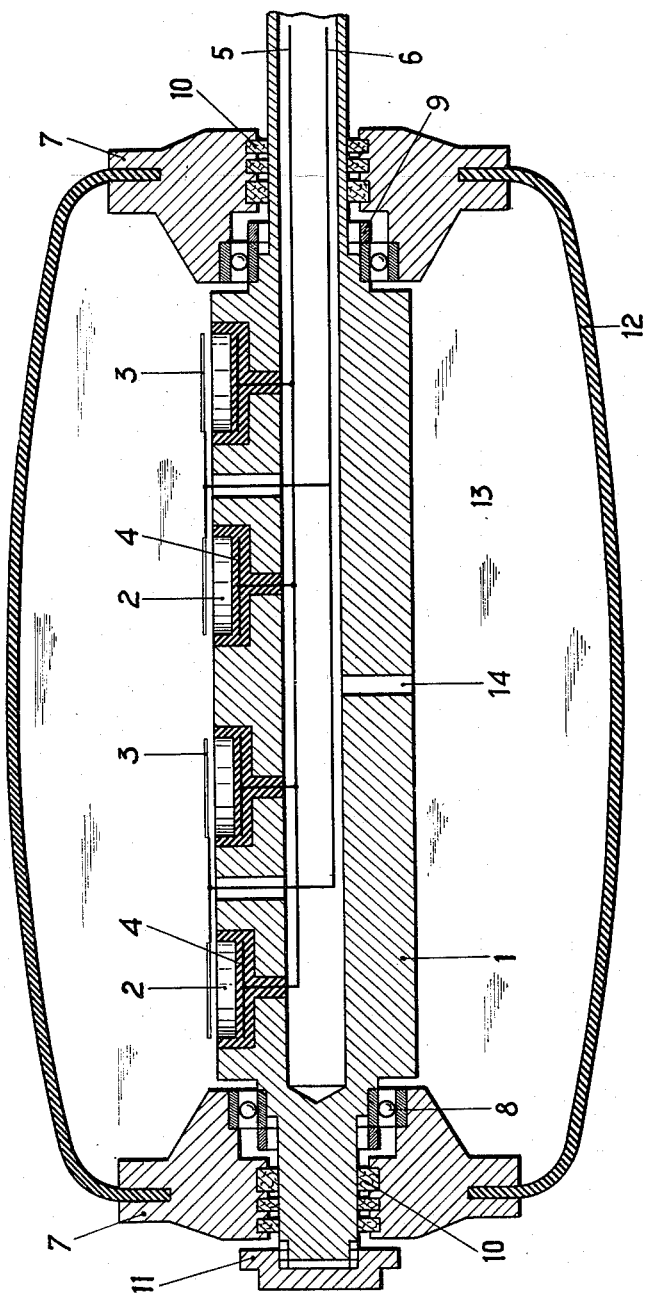
INVENTOR
Marcel Meunier
By Shoemaker & Mattare
ATTORNEYS Patented Mar. 13, 1951

2,545,101

UNITED STATES PATENT OFFICE 2,545,101

ROTATING DIAPHRAGM TRANSDUCER FOR SOLID MATERIAL TESTING

Marcel Meunier, Cuesmes, Belgium, assignor to Ateliers de Constructions Electriques de Charleroi, Brussels, Belgium, a Belgian societe anonyme Application December 6, 1948, Serial No. 63,780
In France December 19, 1947

9 Claims. (Cl. 171—327)

Certain pressure waves, for example sound waves or supersonic waves, can be used for the examination of various bodies in order to discover possible faults, without destroying the shape or the nature of these bodies. Similarly, some of these waves can be used for the treatment of materials or bodies, in particular during the manufacture of a material with a view to a well-defined use in a future utilization.

The examination of these bodies is effected by placing the body to be subjected to the waves between an emitter device and a receiver device of these pressure waves, or a body can be treated merely by placing it in front of a device for emitting such waves. In the case of supersonic waves, the emitting and receiving devices may be formed by piezo-electric quartz crystals, for example.

The passage of the pressure waves from the emitter device to the receiver device, through the body to be examined or treated, is greatly limited, and even in practice prevented, by any film of gas that may exist between the body and the emitter or receiver device owing to the bad contact between these elements. Apart from the exceptional case where the emitter and receiver devices can be cemented or stuck against the body to be subjected to the pressure waves, it may be considered that the transmission of these waves is practically stopped by any solid-to-gas surface of separation. The same applies as regards any surface of separation between a solid and a gas.

Many liquids possess properties such that they transmit pressure waves without too much damping, the intensity of these waves at reception remaining within a range such that they can be employed for practical purposes. It is known that in order to improve the transmission of these pressure waves, use may be made of immersion or spraying devices. However, these arrangements are not of a practical character and cannot be considered in the case of frequent industrial use for examination or treatment by means of pressure waves.

I have already proposed, in my pending application Serial No. 684,614, filed July 18, 1946, now U. S. Patent No. 2,532,507, to use a turgescent "transducer" device for pressure waves, such as sound waves or supersonic waves, which is intended to transmit these waves from a device emitting such waves to a body to be inspected or treated, or from such body to a device for receiving these same waves, wherein the transmission of the pressure waves is effected by means of a liquid under pressure and enclosed by a flexible and protuberant wall, formed of any flexible material capable of bulging under internal liquid pressure or of yielding to external pressure upon contact with a solid body, it being advantageous for the wall to be slightly permeable so as to improve, by means of a film of exuding liquid, the contact with the body to be examined or treated.

However, and although the method of operation is greatly simplified by such transducers, they only allow the treatment or examination of a body by means of pressure waves to be effected "point by point," any prolonged sliding of the turgescent wall over a rough material being liable to involve the destruction of the wall.

The present invention relates to an improvement in the transducer for pressure waves as described in my aforesaid application Serial No. 684,614, the object of this improvement being to apply the principle of the flexible and protuberant walled turgescent transducer in such a manner as to make it possible to effect a continuous examination or treatment of the material or body subjected to the pressure waves.

According to the present invention, the turgescent transducer which is intended to transmit pressure waves (such as sound waves or supersonic waves) from a device for emitting such waves to a body to be inspected or treated, or from said body to a device for receiving these same waves, is characterised in that:

(1) the device for emitting or receiving the pressure waves is located along the axis of a cylinder, (2) the transmission of the pressure waves is effected by means of a liquid under pressure which is a good conductor of such waves, the liquid under pressure being in contact both with the device for emitting or receiving the elastic waves, and also with a flexible and protuberant wall of cylindrical shape surrounding the emitter or receiver device, and (3) the flexible and protuberant wall, which can effectively assume the shape of the surface of the body to be examined or treated by means of the pressure waves, is movable about the axis of the cylinder, being capable of rotating about that axis without carrying with it as it moves the emitter or receiver device, which remains located along the axis of the cylinder, this flexible and protuberant wall being formed of any flexible material, for example rubber, capable of bulging under internal liquid pressure and yielding to external pressure on contact with a solid body.

The wall may be slightly permeable, thereby improving the contact with the body to be examined or treated, by means of a film of exuding liquid which is a good transmitter of the pressure waves.

A turgescent transducer according to the invention is illustrated diagrammatically in the accompanying drawing. All details which are not essential for enabling the invention to be understood clearly have been purposely omitted.

In this drawing, 1 designates the axle of a cylinder formed by the turgescent transducer as a whole, this axle consisting of a hollow shaft which supports the device for emitting or receiving the pressure waves; this device is formed by a number of piezo-electric quartz crystals 2 aligned in a row parallel to the axis of the shaft. The excitation electrodes 3 and 4 for the piezo-electric quartz crystals 2 are fixed on the shaft 1, with interposed insulating material, and are connected to the respective current leads 5 and 6 housed in the bore of the shaft 1, these leads extending from the device for producing the electric oscillations for the excitation or leading to the measuring device (neither of these well-known devices being shown).

The shaft 1 supports, at each end of the emitting or receiving device, a cheek plate 7 which is adapted to rotate freely upon the axle or shaft 1 by means of ball bearings 8 retained on the shaft 1 by ring nuts 9. A locking nut 11 is provided at the end of the shaft.

The cheek plates 7 are provided at their periphery with a circular groove in which is engaged the edge of a flexible protuberant and optionally permeable wall 12 which connects the two cheek plates to one another and thus forms a container. The container is filled with a liquid 13 under pressure, which liquid is a good transmitter of pressure waves, and it may be connected through a hole 14 and along the bore of the shaft 1 to a suitable device adapted to compensate automatically any loss of liquid that may occur either through the fluid-tight packings 10 located between the shaft 1 and the cheek plates 7, or through leaks between imperfectly contacting surfaces, or again through the optionally permeable wall 12.

The turgescent transducer may also be provided with any suitable device adapted to vary the internal pressure of the liquid that transmits the waves, so as to adjust at will the degree of bulging or protuberance of the flexible wall intended to bear against the body to be examined or treated with the waves.

By means of this arrangement, the flexible and protuberant wall 12 can roll over the surface of the body to be examined or treated, without appreciable wear of the wall or surface, the direction of the pressure waves emitted or received remaining fixed in space, as the crystals 2 remain facing the line of contact. Thus the improved device provides for uni-directional distribution of the energy emitted by the crystals 2, which is indispensable for concentration of the supersonic energy in the detection of material defects by means of the emitted waves.

It is obvious that detail modifications may be made in the rotary turgescent transducer according to the invention as hereinbefore described by way of non-limitative example. In particular, the cheek plates that support the protuberant cylindrical wall may be coupled rigidly to one another, the whole arrangement being adapted to rotate about the stationary shaft supporting the emitter or receiver device.

Alternatively, the piezo-electric quartz crystals may be adapted to rotate freely about a central shaft connecting the two cheek plates to one another, the whole arrangement being adapted to rotate in anti-friction bearings on a support provided for that purpose; in this latter case, the direction of propagation of the pressure waves is fixed by an unbalanced mass secured on the emitter or receiver device.

What I claim is:

1. A turgescent transducer for elastic waves, comprising a support, a container mounted rotatably around said support and having a circumferential wall made of flexible material, a wave-translating element mounted upon said support in the interior of said container, and a liquid under pressure filling said container between said wall and said element, said liquid being a good conductor of elastic waves and the pressure of said liquid distending said wall to protuberant shape.

2. A turgescent transducer for elastic waves, comprising an axle, a container mounted rotatably around said axle, said container being of substantially cylindrical shape and having a circumferential wall made of flexible material, a wave-transmitting element mounted upon said axle, and a liquid under pressure filling said container between said wall and said element, said liquid being a good conductor of elastic waves and the pressure of said liquid distending said wall to protuberant shape.

3. A turgescent transducer for elastic waves, comprising an axle, a pair of cheek plates rotatably mounted upon said axle, a substantially cylindrical wall connecting the peripheries of said cheek plates, said wall being made of flexible material and forming with said cheek plates a substantially liquid-tight container, a wave-translating element mounted upon said axle, and a liquid under pressure filling said container between said cheek plates, wall and element, said liquid being a good conductor of elastic waves and the pressure of said liquid distending said wall to protuberant shape between said cheek plates.

4. A turgescent transducer for elastic waves, comprising a hollow axle, a pair of cheek plates rotataly mounted upon said axle, a substantially cylindrical wall connecting the peripheries of said cheek plates, said wall being made of flexible material and forming with said cheek plates a substantially liquid-tight container, a wave-translating element mounted upon said axle, electrical connections of said element extending along the bore of said hollow axle, and a liquid under pressure filling said container between said cheek plates, wall and element, said liquid being a good conductor of elastic waves and the pressure of said liquid distending said wall to protuberant shape between said cheek plates.

5. In the art of subjecting a material object to elastic waves, a turgescent transducer comprising a support, a container mounted rotatably around said support, said container being of substantially cylindrical shape and having a circumferential wall made of flexible material, a wave-emitter element mounted upon said support in the interior of said container, and a liquid under pressure filling said container between said wall and said element, said liquid being a good conductor of elastic waves, and the pressure of said liquid distending said flexible circumferential wall to protuberant shape.

6. In the art of applying elastic waves to a material object, a turgescent transducer comprising a container of substantially cylindrical shape having a circumferential wall made of flexible material, an axle and means for supporting said container rotatably around said axle, a wave-emitter mounted upon said axle in the interior of said container, and a liquid under pressure filling said container, said liquid being a good conductor of elastic waves, and the pressure of said liquid distending said flexible wall to protuberant shape.

7. In the art of examining solid bodies by elastic waves, a turgescent transducer device for application to a body under examination, said transducer device comprising a container, a support around which said container is rotatable, a wave-translating element mounted upon said support in the interior of said container, and a liquid under pressure filling said container, said liquid being a good conductor of elastic waves, and said container including a wall made of flexible material distended by the pressure of said liquid, said flexible wall being adapted to roll over the surface of said body during rotation of said container as the transducer device is moved along in contact with said body.

8. In the art of examining solid bodies by elastic waves, a turgescent transducer device for application to a body under examination, said transducer device comprising a container, a support around which said container is rotatable, a wave-translating element mounted upon said support in the interior of said container, and a liquid under pressure filling said container, said liquid being a good conductor of elastic waves, and said container including a wall made of flexible material distended by the pressure of said liquid, said flexible wall being slightly permeable by said liquid and adapted to roll over the surface of said body during rotation of said container as the transducer device is moved along in contact with said body through a film of liquid exuding through said wall.

9. A pressure-wave translating device, adapted for testing rigid material for hidden defects, including a shaft, said shaft being hollow for a portion of its length, cheek plates rotatably mounted upon said shaft, an annular wall having inturned ends, said wall being made of flexible rubber material, the inturned ends of said wall being seated in said cheek plates to form a liquid-tight container of greater length than diameter, cup-members seated in said shaft, piezo-electric crystals mounted in said cup-members, said crystals being aligned in a single row parallel to the axis of said shaft, excitation electrodes for said crystals, said electrodes being located respectively inwards and outwards in radial relation to said crystals, current leads extending along the interior of the hollow portion of said shaft and connecting with the respective electrodes, and liquid enclosed in the container formed by said annular wall, inturned ends and cheek plates, said liquid being a good conductor of pressure waves, said wall being distensible intermediate of said cheek plates and bulging outwards by the effect of internal liquid pressure in said container, and said container being adapted to espouse a considerable area of a material surface under continuous examination by means of pressure waves transmitted through said liquid and annular wall in alignment with the row of said crystals as the device is rolled over said surface.

MARCEL MEUNIER.

REFERENCES CITED

The following references are of record in the file of this patent:

UNITED STATES PATENTS

| Number | Name | Date |
| --- | --- | --- |
| 926,245 | Coon | June 29, 1909 |
| 2,283,285 | Pohlman | May 19, 1942 |
| 2,405,605 | Goodale et al. | Aug. 13, 1946 |
| 2,431,233 | Erwin | Nov. 18, 1947 |
| 2,434,648 | Goodale et al. | Jan. 20, 1948 |